Feb. 14, 1939. H. SCHULZE-ALSEN 2,146,856
ILLUMINATED SIGN
Filed Nov. 7, 1935
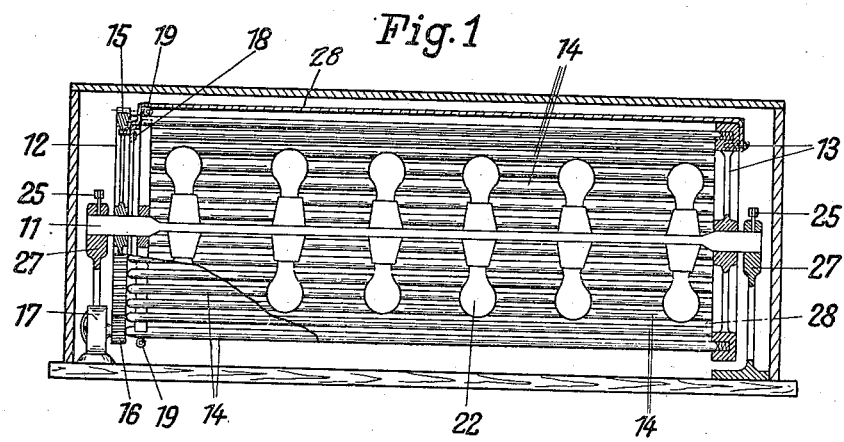
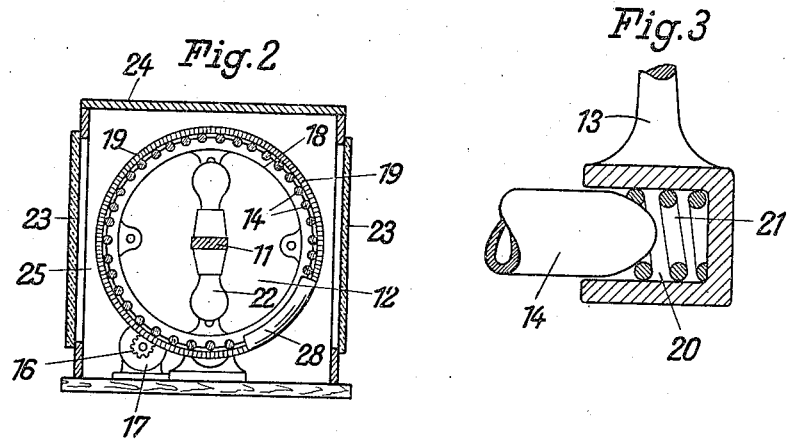
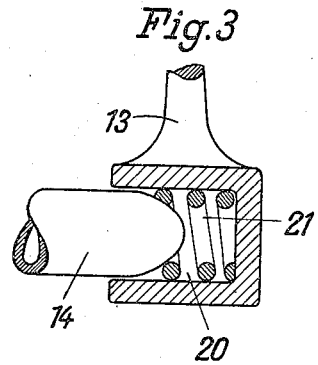
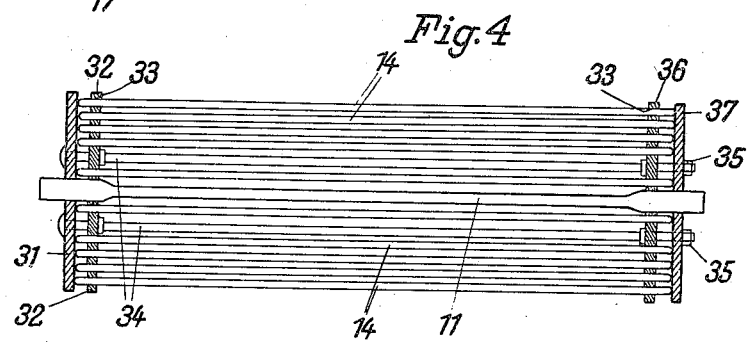
Inventor:
Hans Schulze-Alsen Patented Feb. 14, 1939

2,146,856

UNITED STATES PATENT OFFICE 2,146,856

ILLUMINATED SIGN

Hans Schulze-Alsen, Berlin, Germany, assignor of one-third to Pollopas Patents Ltd., London, England, a company of Great Britain Application November 7, 1935, Serial No. 48,635
In Germany November 7, 1934

6 Claims. (Cl. 40—132)

My invention relates to illuminated advertising signs in which glass letters or other insignia are illuminated from the back by a light source. In the practice of the present invention, glass bars, glass plates or glass tubes having various colours or being opaque are moved between the source of light and the glass signs. Due to the double refraction in the moved glass bars and in the glass letters or other insignia, these signs possess a striking, changing luminous effect in various colours, convey the impression of plastic, sparkling and bubbling letters or other insignia and represent thus an excellent attraction to the eye.

The invention provides for designing these illuminated signs so as to meet the requirements of the practice. This will be obtained by arranging the glass bars, tubes or plates cylindrically either horizontal or vertical and supporting them on both ends, thus forming a drum which can be safely driven and is simple as regards construction and assembly.

To increase the strength of this drum there can be also arranged between the coloured transparent glass bars either bars or plates of semitransparent, preferably opaque material by which will be obtained a sharp change from light to dark and vice versa, and thus an increased advertising effect.

In the drawing:

Fig. 1 shows a longitudinal section through an advertising device in which the glass bars are moved in horizontal direction, Fig. 2 a cross section thereof, Fig. 3 is a sectional view of a fastening member for the glass bars, and Fig. 4 a sectional view of another type of drum.

On the front walls of a case 24 are mounted the glass signs 23, consisting either of solid glass or of glass tubes filled with liquid.

A stationary horizontal rod 11 is fixed in the interior of the apparatus on two supports 27. The rod 11 is adjustably fixed by means of screws 25. On this rod are rotatably arranged two wheels 12 and 13. Wheel 12 carries a gear wheel 15 which meshes with a toothed rim 16 arranged on the shaft of an electric motor 17. To hold the glass bars 14 in position, a rim 18 can be screwed to the wheel 12, this rim being provided with notches 18' used to insert the free ends of the glass bars 14. The glass bars are held in position in the notches by an annular spiral spring 19. The ends of glass bars 14 are secured against lateral displacement by the projecting parts of the wheel 12. The wheel 13 can be of the same shape as the wheel 12. It may, however, as shown on an enlarged scale in Fig. 3, also be provided with recesses or holes 20 which contain springs 21 against which the other ends of glass bars 14 are forced elastically. The rod 11 is provided with lamps 22 at its flattened intermediate portion.

In the modification shown in Fig. 4, the two wheels 12, 13 each consist of two plates 31, 32 and 36, 37 connected to each other, the interior ones of which, 32, 36, have holes of either equal or different distance for inserting glass bars 14. The two wheels are connected to each other by means of bolts 34 and can be displaced axially, so that, first, the glass bars 14 are inserted in the holes 33 of the plates 32, 36 and then secured against axial displacement and falling out by tightening the nuts 35 on the bolts 34. Thus the glass bars 14 constitute together with the wheels 12, 13 a rigid drum which is easily rotatable and simple and reliable as to assembly, design and operation. There may also be used a wheel with a rim having notches on one side of the drum in combination with a wheel having holes on the other side of the drum.

Fig. 2 shows that the revolving glass bars 14 have at all times a different distance from the advertising signs 23 which can be arranged on all sides. Case 24 enclosing the device may be supported separately and made rotatable, so that different advertising signs can be made visible to an observer. The glass tubes can be filled with liquids which are capable of improving the effect of light, colour and refraction.

Bars or plates 28 of stronger opaque material may be inserted over some of the glass bars 14 and secured to the drum by turned portions at each end as shown in Fig. 2, to transmit safely without danger of breaking said bars, the driving power of the motor 17 from the one wheel 12 to the other wheel 13 and to impart an increased strength to the rotating cylinder.

In the position of the rotating cylinder shown with dotted lines in Fig. 1, the lower portion of the right hand glass signs 23 is dark owing to the opaque plate 28 and brightens in the respective direction of rotation from top to bottom, until after one revolution of the rotating cylinder the letters are again darkened from top to bottom. Apart from the increased strength of the rotating cylinder, an increased advertising effect will thus be obtained by means of these bars or plates 28 of opaque or nearly opaque material, comprising also blackened glass plates or glass bars. Several systems of this kind can be appropriately combined, for instance, with vertically arranged glass bars in such a manner that the opaque insertions of the individual systems are staggered, thus a dark zone will continuously pass the letters. For each individual letter of the text, several systems of this kind may also be provided and composed in the fashion of a box of bricks. In this manner living figures, for instance, rising pearls in a champagne glass may be produced.

Many other modifications and changes in detail may be made without departing from the spirit and the scope of my invention as shown in the accompanying drawings and pointed out in the appended claims. The term "bars" as used in the claims is intended to include also plates and tubes and other forms which may be capable of giving the desired effects in the present invention. The term "recesses" is intended to include notches, holes, depressions and bores.

Therefore, what I claim as new and useful and of my own invention and desire to secure by Letters Patents is:

1. In an illuminated sign, a display member having indicia thereon constituting display signs, said member having portions allowing light to pass through to reach the observer, glass bars arranged cylindrically and moved between a source of light and the signs, wheels for supporting the glass bars on both ends, thus forming a rigid drum together with the glass bars, a resilient member in operative relation to said bars and maintaining the engagements of said bars with said wheels, whereby they are yieldingly held on said wheels and a single bar may be removed without disturbing the remaining bars, said display surface being interposed between the observer and said bar assembly.

2. In an illuminated sign, a display member having indicia thereon constituting display signs, said member having portions allowing light to pass through to reach the observer, glass bars arranged cylindrically and moved between a light source and the signs, wheels for supporting the glass bars on both ends and provided with recesses for holding the free ends, at least one of said wheels being provided with a series of recesses at the periphery thereof, means for holding said bars in place on said wheel, whereby said recesses hold said free ends in spaced relation, said display surface being interposed between the observer and said bar assembly.

3. In an illuminated sign, a display member having indicia thereon constituting display signs, said member having portions allowing light to pass through to reach the observer, glass bars arranged cylindrically and moved between a light source and the signs, wheels for supporting the glass bars on both ends, at least one of said wheels being provided with a notched rim for inserting the free ends of the glass bars, and a spring for holding said bars in said notched rim, and means for holding the opposite ends of said bars in place on the other of said wheels, said display surface being interposed between the observer and said bar assembly.

4. In an illuminated sign, a display member having indicia thereon constituting display signs, said member having portions allowing light to pass through to reach the observer, glass bars arranged cylindrically and moved between a light source and the signs, a wheel for supporting glass bars on one end and provided with a notched rim for inserting the free ends of the glass bars, means for holding said bars in place on said rim, in combination with a wheel having holes into which the glass bars extend on the other end, said display surface being interposed between the observer and said bar assembly.

5. In an illuminated sign, a display member having indicia thereon constituting display signs, said member having portions allowing light to pass through to reach the observer, glass bars arranged cylindrically and moved between a source of light and the signs, wheels for supporting the glass bars on both ends, thus forming a rigid drum together with the glass bars, a resilient member in operative relation to said bars and maintaining the engagements of said bars with said wheels, whereby they are yieldingly held on said wheels and a single bar may be removed without disturbing the remaining bars, said display surface being interposed between the observer and said bar assembly, whereby there is obtained double refraction of light and conspicuousness of the signs.

6. In an illuminated sign, a display member having indicia thereon constituting display signs, said member having portions allowing light to pass through to reach the observer, glass bars arranged cylindrically and moved between a source of light and the signs, wheels for supporting the glass bars on both ends, thus forming a rigid drum together with the glass bars, a resilient member surrounding said bars and maintaining the engagements of said bars with said wheels, whereby they are yieldingly held on said wheels and a single bar may be removed without disturbing the remaining bars, said display surface being interposed between the observer and said bar assembly.

HANS SCHULZE-ALSEN.